United States Patent
Cho et al.

(10) Patent No.: US 9,952,907 B2
(45) Date of Patent: Apr. 24, 2018

(54) METHOD AND APPARATUS FOR MANAGING DATA

(75) Inventors: Hyung-rae Cho, Seoul (KR); Hyun-joo Oh, Seoul (KR); Ji-hyeon Kweon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/236,228

(22) Filed: Sep. 19, 2011

(65) Prior Publication Data

US 2012/0072566 A1 Mar. 22, 2012

(30) Foreign Application Priority Data

Sep. 17, 2010 (KR) .................. 10-2010-0091961

(51) Int. Cl.
  *G06F 15/173* (2006.01)
  *G06F 9/50* (2006.01)
  *G06Q 50/00* (2012.01)

(52) U.S. Cl.
  CPC ........... *G06F 9/5072* (2013.01); *G06Q 50/01* (2013.01)

(58) Field of Classification Search
  CPC ..... H04L 51/32; H04L 12/588; H04L 63/102; G06F 9/5072
  USPC ...................................................... 709/223
  See application file for complete search history.

(56) References Cited

U.S. PATENT DOCUMENTS

| 8,296,380 | B1* | 10/2012 | Kelly | ................ G06F 17/30528 703/23 |
| 2002/0134830 | A1* | 9/2002 | Golub | ............... G06F 17/30879 235/375 |
| 2006/0085750 | A1 | 4/2006 | Easton, Jr. et al. | |
| 2006/0242581 | A1 | 10/2006 | Manion et al. | |
| 2007/0157104 | A1* | 7/2007 | Blain | .................. G06F 3/04842 715/771 |
| 2008/0052639 | A1 | 2/2008 | Chun et al. | |
| 2008/0104119 | A1 | 5/2008 | Cho et al. | |
| 2008/0134054 | A1* | 6/2008 | Clark | ................ G06F 17/30011 715/753 |
| 2008/0208893 | A1* | 8/2008 | Bhagwan | .......... G06F 17/30067 |
| 2008/0307311 | A1 | 12/2008 | Eyal | |
| 2009/0132373 | A1* | 5/2009 | Redlich | .................. G06Q 30/02 705/14.39 |
| 2009/0177670 | A1* | 7/2009 | Grenier | ............. G06F 17/30867 |
| 2009/0271247 | A1 | 10/2009 | Karelin et al. | |

(Continued)

FOREIGN PATENT DOCUMENTS

| CN | 101175232 | 5/2008 |
| CN | 101359992 | 2/2009 |

(Continued)

OTHER PUBLICATIONS

Chinese Office Action dated Jun. 29, 2016 issued in counterpart application No. 201180044669.5, 16 pages.

(Continued)

*Primary Examiner* — Mohamed Ibrahim
(74) *Attorney, Agent, or Firm* — The Farrell Law Firm, P.C.

(57) ABSTRACT

A method and apparatus for managing data is provided, including determining one or more network services associated with user-uploaded data stored in a database, and linking the user-uploaded data with the one or more network services to provide the user-uploaded data via the one or more network services.

17 Claims, 4 Drawing Sheets

(56) References Cited

U.S. PATENT DOCUMENTS

| | | | |
|---|---|---|---|
| 2009/0292782 A1 | 11/2009 | Kim et al. | |
| 2010/0146048 A1* | 6/2010 | Rothstein | G06F 17/3089 709/204 |
| 2010/0208069 A1* | 8/2010 | Rezvani | H04L 41/22 348/143 |
| 2010/0242074 A1* | 9/2010 | Rouse | H04L 12/588 725/100 |
| 2010/0262658 A1* | 10/2010 | Mesnage | G06Q 10/06 709/204 |
| 2010/0268778 A1* | 10/2010 | Kim | H04L 67/16 709/204 |
| 2010/0324990 A1 | 12/2010 | D'Angelo et al. | |
| 2011/0004922 A1* | 1/2011 | Bono | G06F 21/6263 726/4 |
| 2011/0010384 A1* | 1/2011 | Luo | G06Q 10/10 707/769 |
| 2011/0087647 A1* | 4/2011 | Signorini | G06F 17/30867 707/709 |
| 2011/0137894 A1* | 6/2011 | Narayanan | G06F 17/3089 707/723 |
| 2011/0138304 A1* | 6/2011 | Ungerman | G06F 3/0486 715/753 |
| 2011/0161398 A1* | 6/2011 | Guccione | G06Q 10/10 709/203 |
| 2011/0202406 A1* | 8/2011 | Suomela | G06Q 30/02 705/14.52 |
| 2011/0218044 A1* | 9/2011 | Joshi | G06Q 30/0257 463/37 |
| 2011/0218996 A1* | 9/2011 | Jin | G06F 15/16 707/737 |
| 2011/0270931 A1* | 11/2011 | Cheng | H04L 12/587 709/206 |
| 2011/0283185 A1* | 11/2011 | Obasanjo | G06F 17/3089 715/243 |
| 2011/0307791 A1* | 12/2011 | Pierre | G06Q 10/10 715/736 |
| 2011/0307957 A1* | 12/2011 | Barcelo | G06F 21/552 726/25 |
| 2011/0314528 A1* | 12/2011 | Dolin | G06Q 50/01 726/7 |
| 2012/0054369 A1* | 3/2012 | Shafi | G06F 17/30893 709/246 |
| 2012/0060105 A1* | 3/2012 | Brown | H04L 12/587 715/753 |
| 2012/0060108 A1* | 3/2012 | Domartini | G06Q 30/0601 715/768 |

FOREIGN PATENT DOCUMENTS

| | | |
|---|---|---|
| CN | 101715586 | 5/2010 |
| CN | 101790880 | 7/2010 |
| CN | 101802787 | 8/2010 |
| JP | 2008-140353 | 6/2008 |
| JP | 2008-257457 | 10/2008 |
| JP | 2008-301442 | 12/2008 |
| JP | 2010-039871 | 2/2010 |
| JP | 2010-527492 | 8/2010 |
| JP | 2012-038273 | 2/2012 |
| KR | 1020080008319 | 1/2008 |
| KR | 1020080099388 | 11/2008 |
| KR | 1020090127586 | 12/2009 |

OTHER PUBLICATIONS

European Search Report dated Mar. 30, 2016 issued in counterpart application No. 11825409.3-1955, 7 pages.
Korean Office Action dated Jun. 16, 2016 issued in counterpart application No. 10-2010-0091961, 11 pages.
Mikio Maeda et al., "A Study of SNS Contents Circulation Method to Promote Communications", Electronic Information Communication Academy, Communication Society Conference Lecture Proceedings 2, Corporation Aggregation Electronic Information Communication Academy, Sep. 1, 2009, 2 pages.
Chinese Office Action dated Sep. 16, 2015 issued in counterpart application No. 201180044669.5, 10 pages.
Japanese Office Action dated Oct. 26, 2015 issued in counterpart application No. 2013-529055, 7 pages.
Korean Office Action dated Feb. 28, 2017 issued in counterpart application No. 10-2010-0091961, 12 pages.
Chinese Office Action dated Dec. 29, 2016 issued in counterpart application No. 201180044669.5, 18 pages.
Japanese Office Action dated Jan. 22, 2018 issued in counterpart application No. 2016-227644, 6 pages.

* cited by examiner

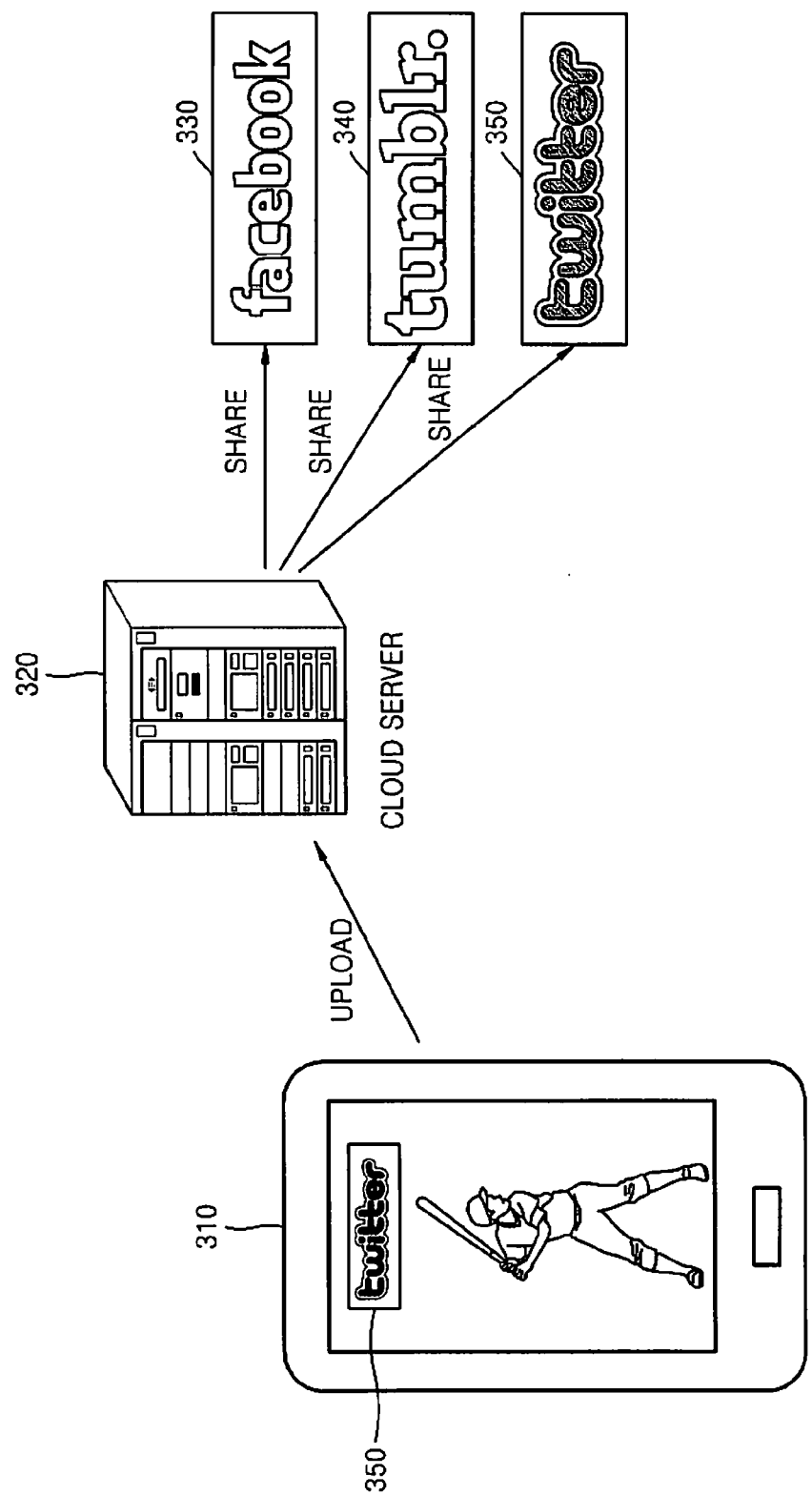

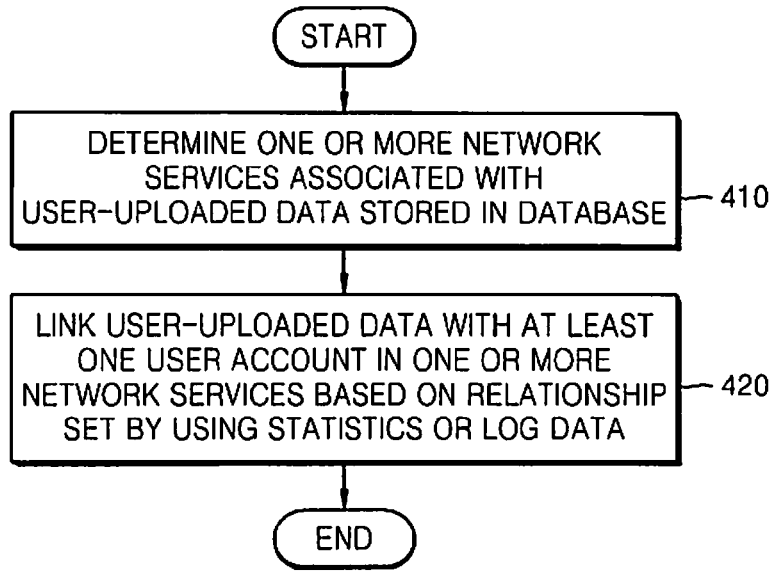
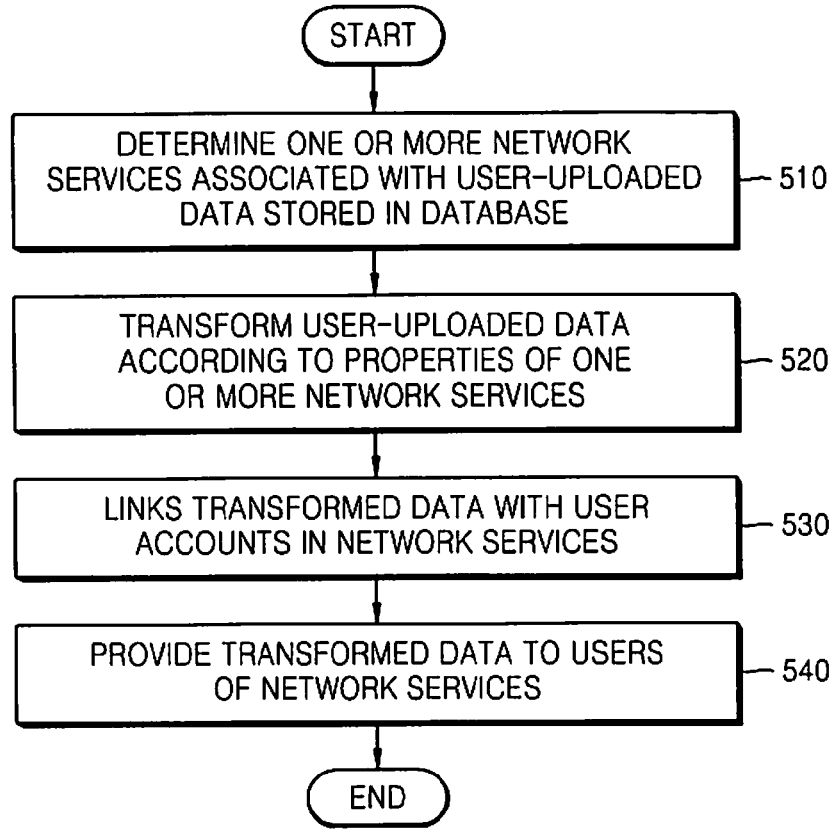

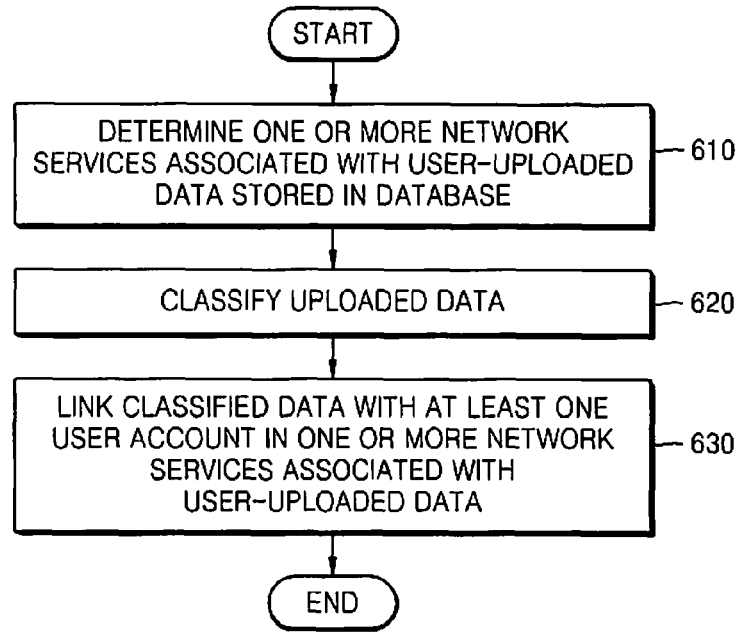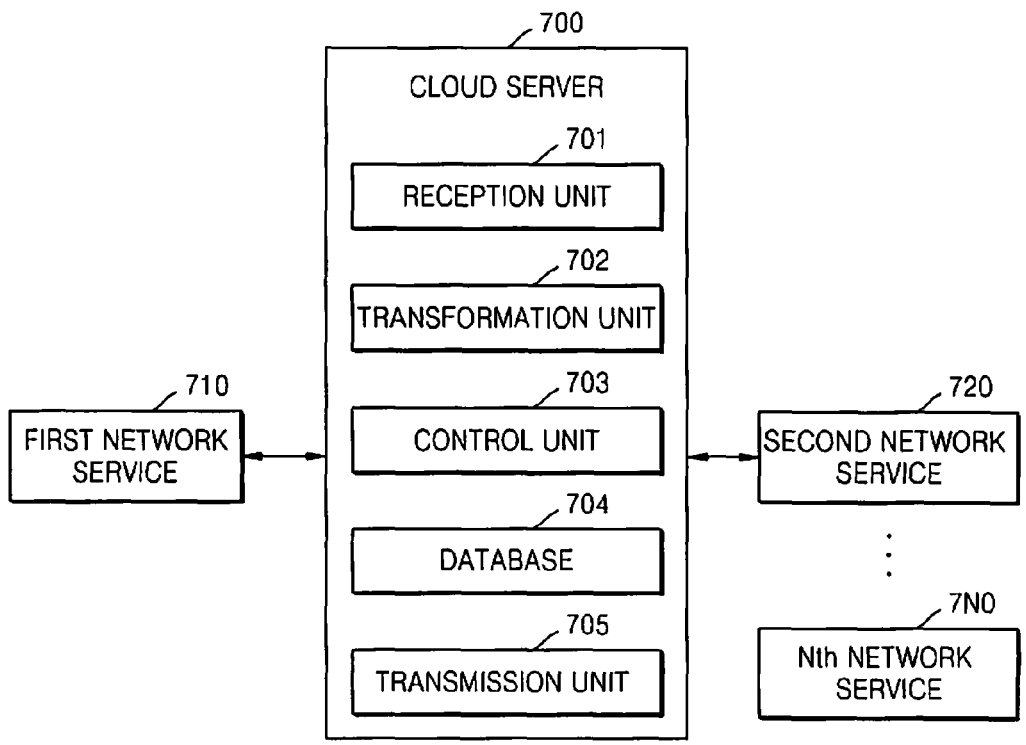

METHOD AND APPARATUS FOR MANAGING DATA

PRIORITY

This application claims priority to Korean Patent Application No. 10-2010-0091961, filed on Sep. 17, 2010, in the Korean Intellectual Property Office, the entire disclosure of which is incorporated herein by reference.

BACKGROUND OF THE INVENTION

1. Field of the Invention

The present invention relates generally to a method and apparatus for managing data, and more particularly, to a method and apparatus for managing data uploaded to a network by linking the user-uploaded data with a user account.

2. Description of the Related Art

Cloud computing refers to a computing environment in which simultaneous use of Information Technology (IT) services such as storing data, accessing a network, and using content is allowed via a server on the Internet, and data is temporarily cached in clients such as electronic devices (e.g., a desktop computer or a smartphone). That is, cloud computing is a concept in which all of a user's information is stored on a server on the Internet, allowing the user to use various electronic devices to access and use the information any time and anywhere. In other words, cloud computing is a computing service for allowing users to use computing resources that are formless like a cloud, e.g., hardware or software, as much as they want and the users may be charged for the service, and refers to a technology for virtually integrating and providing computing resources existing at different physical locations. Cloud computing, which is an innovative computing technology for simultaneously providing IT services such as storing data, data processing, accessing a network, and using content, by a cloud server on the Internet, is also defined as an on-demand outsourcing service of IT resources by using the Internet. The Institute of Electrical and Electronics Engineers (IEEE) defines that "Cloud Computing is a paradigm in which information is permanently stored in servers on the Internet and cached temporarily on clients that include desktops, entertainment centers, table computers, notebooks, wall computers, handhelds, sensors, monitors, etc.".

A Social Network Service (SNS) is an online personal connection service. An SNS is a concept including one-man media, one-man communities, information sharing, and the like and is a community type website that allows subscribers to introduce their friends to each other, expanding their personal networks. Currently, since smartphones such as Apple iPhones and Samsung Galaxy phones have recently become popular, users of SNS services have greatly increased. Examples of SNSs include twitter, facebook, tumblr, and Myspace.

SUMMARY OF THE INVENTION

The present invention provides a method and apparatus for managing data uploaded to a network by a user by linking the user-uploaded data with a user account of a network service associated with the user-uploaded data.

According to an aspect of the present invention, a method of managing data is provided, the method including determining one or more network services associated with user-uploaded data stored in a database; and linking the user-uploaded data with the one or more network services to provide the user-uploaded data via the one or more network services.

According to another aspect of the present invention, an apparatus for managing data is provided, the apparatus including a database for storing user-uploaded data; and a control unit for determining one or more network services associated with user-uploaded data stored in the database, and for linking the user-uploaded data with the one or more network services to provide the user-uploaded data via the one or more network services.

According to another aspect of the present invention, a non-transitory computer-readable recording medium having recorded thereon a computer program for executing a method of managing data, the method including determining one or more network services associated with user-uploaded data stored in a database; and linking the user-uploaded data with the one or more network services to provide the user-uploaded data using the one or more network services.

BRIEF DESCRIPTION OF THE DRAWINGS

The above and other features and advantages of the present invention will become more apparent by describing in detail embodiments thereof with reference to the attached drawings in which:

FIG. 3 is a flowchart illustrating a method of sharing user-uploaded data, according to an embodiment of the present invention;

FIGS. 4 through 6 are flowcharts illustrating a method of managing data, according to other embodiments of the present invention; and FIG. 7 is a block diagram illustrating an apparatus for managing data, according to an embodiment of the present invention.

DETAILED DESCRIPTION OF EMBODIMENTS OF THE PRESENT INVENTION

Hereinafter, the present invention will be described in detail by explaining embodiments of the invention with reference to the attached drawings.

Figure 1:
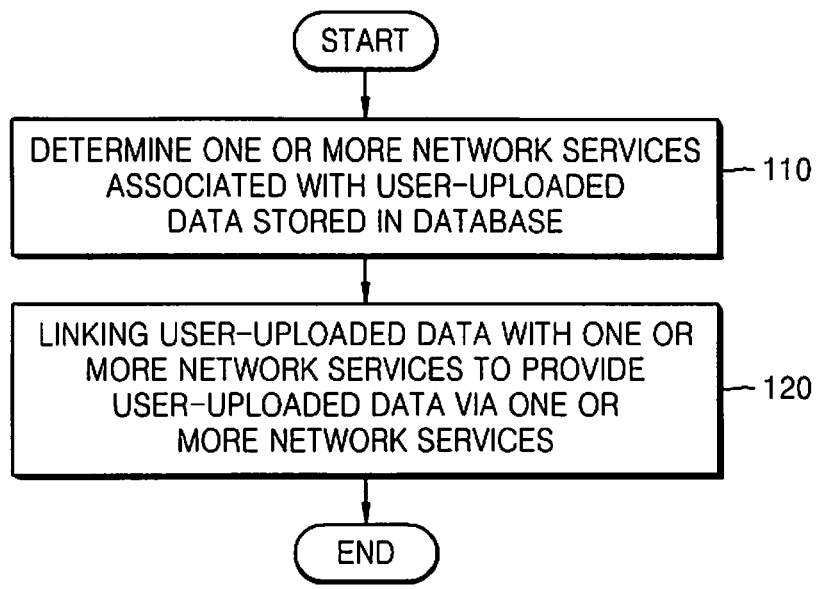
FIG. 1 is a flowchart illustrating a method of managing data, according to an embodiment of the present invention.

FIG. 1 is a flowchart of a method of managing data, performed by a cloud server, according to an embodiment of the present invention.

Referring to FIG. 1, in step 110, the cloud server determines one or more network services associated with user-uploaded data stored in a database. The cloud server receives data from a user of the cloud server, and determines one or more network services associated with the received data. Users of the cloud server may be linked to one another directly, or the cloud server may link the users. Accordingly, if a user uploads data, the cloud server may determine one or more network services of other users associated with the user-uploaded data. The user-uploaded data may refer to but is not limited to text or media content.

In step 120, the cloud server links the user-uploaded data with the one or more network services to provide the user-uploaded data via the one or more network services. Thus, the cloud server links the user-uploaded data with the determined network services linked with the cloud server. The cloud server links the user-uploaded data with user accounts in the network services based on the user-uploaded data. That is, in FIG. 1, the user-uploaded data is linked with the network services. For example, the cloud server links the user-uploaded data with the user accounts in the network services based on information included in the user-uploaded data. Since a user uploads the data, an example of the information included in the user-uploaded data may be user information of the user who uploads the data.

Figure 2:
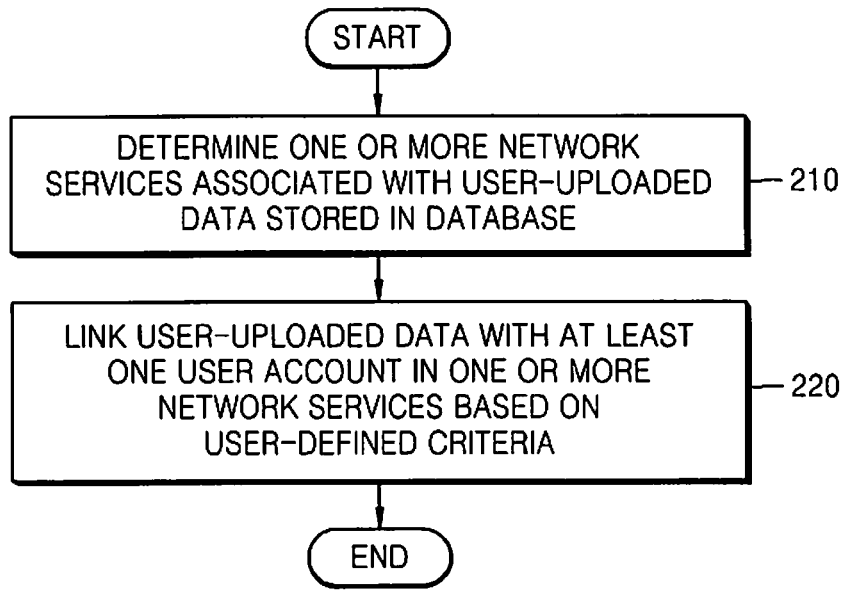
FIG. 2 is a flowchart illustrating a method of managing data, according to another embodiment of the present invention.

FIG. 2 is a flowchart of a method of managing data, according to another embodiment of the present invention.

Referring to FIG. 2, step 210 is the same as step 110 illustrated in FIG. 1, and thus will not be described here.

In step 220, a cloud server links the user-uploaded data with at least one user account in one or more network services based on user-defined criteria. The user-defined criteria may be a relationship between a user who uploads the data and a user of the user account. The cloud server may link the user-uploaded data with the user account in the network services based on the user-defined criteria, i.e. a preset condition. More specifically, the cloud server determines a user account to be linked based on the user-defined criteria that is a relationship between the user who uploads the data and the user of the user account. For example, if a user A uploads data to the cloud server by using a first network service, the cloud server checks a relationship between the user A who uploads the data and another user B of the cloud server. The cloud server then links the user-uploaded data with a user account linked with the other user B in the first network service or a second network service. The data uploaded by the user A may be linked with the user account in the second network service that is not associated with the user A. According to an embodiment of the present invention, a network service may be a Social Network Service (SNS). In this case, a relationship may refer to a relationship between subscribers in terms of being family, friends, or followers in one or more SNSs. For example, a user of the social networking website "facebook", which is an example of an SNS, may set a relationship with another user as family or a friend, and a user of the micro-blogging site "twitter", which is another example of an SNS, may set a relationship with another user as a follower. If a relationship is set, data such as text or content uploaded by a user of an SNS may be linked with a user account of another user with whom a relationship is set, and, may thus be shared. The cloud server does not link the user-uploaded data only with another user of the SNS used to upload the data, but may also allow the user-uploaded data to be shared in a plurality of SNSs subscribed to by other users associated with the user who has uploaded the data. A data upload notification message may be transmitted to the user of the user account. After the user-uploaded data is linked with the user account, the cloud server may transmit a data connection notification message to the user account of the user with whom a relationship is set. If the user who receives the data connection notification message accepts the data connection notification message, the user-uploaded data may be shared.

FIG. 3 is a flowchart of a method of sharing user-uploaded data, according to an embodiment of the present invention.

Referring to FIG. 3, a user of a smartphone 310 uploads data to a cloud server 320 by using twitter 350. The cloud server 320 determines that facebook 330, tumblr 340, and twitter 350 are SNSs associated with the user-uploaded data. Facebook 330, tumblr 340, and twitter 350 are examples of SNSs. The cloud server 320 then links the user-uploaded data with facebook 330, tumblr 340, and twitter 350. More specifically, the cloud server 320 links the user-uploaded data with user accounts of users of facebook 330, tumblr 340, and twitter 350 with whom the user of the smartphone 310 has set as family, friend, or follower relationships. The cloud server 320 may then transmit a data upload notification message to the users of the linked user accounts in facebook 330, tumblr 340, and twitter 350. If users who receive the data upload notification message accept the data upload notification message, the user-uploaded data may be shared.

FIG. 4 is a flowchart of a method of managing data, according to another embodiment of the present invention.

Referring to FIG. 4, step 410 is the same as step 110 illustrated in FIG. 1, and, thus, will not be described here.

In step 420, a cloud server links user-uploaded data with at least one user account in one or more network services based on a relationship set by using statistics or log data. The cloud server may link the user-uploaded data with the user account in the network services based on user-defined criteria. Specifically, the cloud server determines a user account to be linked based on the user-defined criteria that is the relationship between a user who uploads the data and the user of the user account. The cloud server may set the statistics or log for a user of the cloud server by using a user profile or a user history of the user. The cloud server may check a preference of the user based on the user profile, and may set the statistics or log according to the frequency or type of use of a service by the user. For example, if a user A uploads data associated with food to the cloud server by using a first network service, the cloud server checks user profiles of other users of the cloud server, which include preferences of the other users, and links the user-uploaded data with a user account of a user who prefers the same food. The cloud server links the user-uploaded data with the user account regardless of a relationship with the user A or a network service. Also, if data associated with food at a certain place is uploaded to the cloud server, the cloud server further checks area ranges or current locations of other users, and links the user-uploaded data with a user account of a user associated with both the place and the food.

FIG. 5 is a flowchart of a method of managing data, according to another embodiment of the present invention.

Referring to FIG. 5, step 510 is the same as step 110, as illustrated in FIG. 1, and thus will not be described here.

In step 520, a cloud server transforms user-uploaded data according to properties of one or more network services because the network services use different content presentation methods according to their properties. For example, twitter links images and videos from external websites, and facebook internally stores images and videos. Accordingly, since the network services use different content presentation methods according to their properties, the cloud server has to transform the user-uploaded data to transmit different data to different service providers. In order to transform the user-uploaded data, the cloud server divides the user-uploaded data into sources, e.g., multimedia content and text. After that, the cloud server receives content configuration policies from the network services, and then processes the sources based on the content configuration policies.

In step 530, the cloud server links the transformed data with user accounts in the network services.

In step 540, the cloud server provides the transformed data to users of the linked user accounts in the network services. The cloud server provides the reprocessed sources to the users of the linked user accounts according to formats of providers of the network services. The reprocessed sources may be provided if the user-uploaded data is requested by a provider of a linked network service.

FIG. 6 is a flowchart of a method of managing data, according to another embodiment of the present invention.

Referring to FIG. 6, step 610 is the same as step 110, as illustrated in FIG. 1, and, thus, will not be described here.

In step 620, a cloud server classifies user-uploaded data according to a predetermined reference. The cloud server extracts metadata included in the user-uploaded data, and classifies the user-uploaded data based on the extracted metadata. For example, if the user-uploaded data is user-created text, the cloud server may extract the metadata by parsing each word and obtaining the meaning of each word. Further, the cloud server may extract the metadata by performing data mining if the user-created texts are accumulated to form a history. If the user-uploaded data is linked text, since an address is included in a padding portion of an upload packet with respect to data (text or an image) uploaded by using a linking method in a web browser, the cloud server may extract the metadata by extracting the address. Otherwise, if the user-uploaded data is a photo, the cloud server may extract the metadata by checking a location where the photo was captured by using Global Positioning System (GPS) information included in the photo, finding a specific location by searching for an Access Point (AP) having the largest signal intensity, and finding an image having the highest matching probability by comparing the photo to images provided by a provider of a network service in a region of the AP. For example, if the user-uploaded data is a photo of Nike shoes, the cloud server finds a rough location (e.g., Macy's Department Store, New York, United States) by using GPS information, and finds a specific location (e.g., $6^{th}$ floor, Macy's Department Store, New York, United States) by checking signal intensities of APs. The cloud server may then extract the metadata by comparing the uploaded photo to images provided by a Nike shop on the $6^{th}$ floor, Macy's Department Store, New York, United States.

In step 630, the cloud server links the classified data with at least one user account in one or more network services associated with the user-uploaded data.

FIG. 7 is a block diagram of an apparatus for managing data, according to an embodiment of the present invention.

Referring to FIG. 7, a cloud server 700 includes a reception unit 701, a data transformation unit 702, a control unit 703, a database 704, and a transmission unit 705. Furthermore, the cloud server 700 is linked with first through $N^{th}$ network services 710 through 7N0 in a predetermined communication network. In FIG. 7, it is assumed that a user who updates data is a user of the first network service 710.

First Example

The reception unit 701 receives data uploaded by the user of the first network service 710 and the database 704 stores the user-uploaded data.

The control unit 703 determines one or more network services associated with user-uploaded data stored in the database 704. Users of the cloud server 700 may be linked to one another, or the cloud server 700 may link the users. If the user uploads data, the control unit 703 may determine one or more network services of other users associated with the user-uploaded data. According to an embodiment of the present invention, a network service may be an SNS. The control unit 703 may determine at least one of the second through Nth network services 720 through 7N0 as the network services associated with the user-uploaded data. The user-uploaded data may refer to but is not limited to text or media content.

Then, the control unit 703 links the user-uploaded data with the one or more network services to provide the user-uploaded data via the one or more network services. The control unit 703 links the user-uploaded data with user accounts in the network services based on the user-uploaded data. That is, in the First Example, the user-uploaded data is linked with the network services. For example, the control unit 703 links the user-uploaded data with the user accounts in the network services based on information included in the user-uploaded data. Since a user uploads the data, an example of the information included in the user-uploaded data may be user information of the user who uploads the data.

Second Example

The reception unit 701 receives data uploaded by the user of the first network service 710 and database 704 stores the user-uploaded data.

The control unit 703 links the user-uploaded data with at least one user account in one or more network services based on user-defined criteria. The user-defined criteria may be a relationship between the user who uploads the data and a user of the user account. The control unit 703 may link the user-uploaded data with the user account in the network services based on the user-defined criteria. More specifically, the control unit 703 determines a user account to be linked based on the user-defined criteria that is the relationship between the user who uploads the data and the user of the user account. For example, if a user A uploads data to the cloud server 700 by using the first network service 710, the control unit 703 checks a relationship between the user A who uploads the data and another user B of the cloud server 700. The control unit 703 then links the user-uploaded data with a user account linked with the other user B in the first network service 710 or the second network service 720. The data uploaded by the user A may be linked with the user account in the second network service 720 that is not associated with the user A. In SNSs, a relationship may refer to a relationship between subscribers in terms of being family, friends, or followers in one or more SNSs. For example, a user of "facebook" that is an example of an SNS may set a relationship with another user as family or a friend, and a user of "twitter" that is another example of an SNS may set a relationship with another user as a follower. If a relationship is set, data such as text or content uploaded by a user of an SNS may be linked with a user account of another user with whom a relationship is set, and thus may be shared. The control unit 703 does not link the user-uploaded data only with another user of the SNS used to upload the data, but may allow the user-uploaded data to be shared in a plurality of SNSs subscribed to by other users associated with the user who uploads the data.

The transmission unit 705 may transmit a data upload notification message to the user of the user account. After the user-uploaded data is linked with the user account, the transmission unit 705 may transmit a data connection notification message to the user account of the user with whom a relationship is set. If the user who receives the data connection notification message accepts the data connection notification message, the user-uploaded data may be shared.

Third Example

The reception unit 701 receives data uploaded by the user of the first network service 710 and database 704 stores the user-uploaded data. Also, the database 704 may store statistics or a log associated with a user of the cloud server 700.

The control unit 703 links the user-uploaded data with at least one user account in one or more network services based on a relationship set by using the statistics or log stored in the database 704. The control unit 703 may link the user-uploaded data with the user account in the network services based on user-defined criteria. More specifically, the control unit 703 determines a user account to be linked based on the user-defined criteria that is the relationship set by using the statistics or log. The control unit 703 may set statistics or log for a user of the cloud server 700 by using a user profile or a user history of the user. Specifically, the control unit 703 may check a preference of the user based on the user profile, and may set the statistics or log according to the frequency or type of use of a service by the user. For example, if a user A uploads data associated with food to the cloud server 700 by using the first network service 710, the control unit 703 checks user profiles of other users of the cloud server 700, which include preferences of the other users, and links the user-uploaded data with a user account of a user who prefers the same food. Thus, the control unit 703 links the user-uploaded data with the user account regardless of a relationship with the user A or a network service. Moreover, if data associated with food at a certain place is uploaded to the cloud server 700, the control unit 703 further checks in the range of the area or current locations of other users, and links the user-uploaded data with a user account of a user associated with both the place and the food.

Fourth Example

The reception unit 701 receives data uploaded by the user of the first network service 710 and database 704 stores the user-uploaded data.

The data transformation unit 702 transforms the user-uploaded data according to properties of one or more network services because the network services use different content presentation methods according to their properties. For example, from among SNSs, twitter links images and videos from external websites, and facebook internally stores images and videos. Accordingly, since the network services use different content presentation methods according to their properties, the cloud server 700 has to transform the user-uploaded data to transmit different data to different service providers. In order to transform the user-uploaded data, the data transformation unit 702 divides the user-uploaded data into sources, e.g., multimedia content and text. The reception unit 701 then receives content configuration policies from the network services, and the data transformation unit 702 then processes the sources based on the content configuration policies.

The control unit 703 links the transformed data with user accounts in the network services. The control unit 703 then provides the transformed data via the transmission unit 705 to users of the linked user accounts in the network services. The control unit 703 provides the reprocessed sources to the users of the linked user accounts according to formats of providers of the network services. The control unit 703 may provide the reprocessed sources if the user-uploaded data is requested by a provider of a linked network service.

Fifth Example

The reception unit 701 receives data uploaded by the user of the first network service 710 and database 704 stores the user-uploaded data.

The control unit 703 classifies the user-uploaded data according to a predetermined reference. The control unit 703 extracts metadata included in the user-uploaded data, and classifies the user-uploaded data based on the extracted metadata. For example, if the user-uploaded data is user-created text, the control unit 703 may extract the metadata by parsing each word and obtaining a meaning of each word. Further, the control unit 703 may extract the metadata by performing data mining if the user-created texts are accumulated to form a history. If the user-uploaded data is linked text, since an address is included in a padding portion of an upload packet with respect to data (text or an image) uploaded by using a linking method in a web browser, the control unit 703 may extract the metadata by extracting the address. Otherwise, if the user-uploaded data is a photo, the control unit 703 may extract the metadata by checking a location where the photo was captured by using GPS information included in the photo, finding a specific location by searching for an AP having the largest signal intensity, and finding an image having the highest matching probability by comparing the photo to images provided by a provider of a network service in a region of the AP. For example, if the user-uploaded data is a photo of Nike shoes, the control unit 703 finds a rough location (e.g., Macy's Department Store, New York, United States) by using GPS information, and finds a specific location (e.g., $6^{th}$ floor, Macy's Department Store, New York, United States) by checking signal intensities of APs. After that, the control unit 703 may extract the metadata by comparing the uploaded photo to images provided by a Nike shop on the $6^{th}$ floor, Macy's Department Store, New York, United States.

The control unit 703 then links the classified data with at least one user account in one or more network services associated with the user-uploaded data.

The present invention can also be implemented as computer-readable code on a non-transitory computer-readable recording medium. The computer-readable recording medium is any data storage device that can store data which can be thereafter read by a computer system. Examples of the computer-readable recording medium include Read-Only Memory (ROM), Random-Access Memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art.

While the present invention has been particularly shown and described with reference to embodiments thereof, it will be understood by one of ordinary skill in the art that various changes in form and details may be made therein without departing from the spirit and scope of the invention as defined by the following claims and their equivalents.

What is claimed is:
1. A cloud server, comprising:
 a memory configured to store first-user-uploaded data received from a first user;
 a control unit configured to:
  determine one or more Social Network Services (SNSs) of at least one second user from a plurality of network services associated with the first-user-uploaded stored in the memory;
  transform the first-user-uploaded data based on properties of the determined one or more SNSs; and link the transformed first-user-uploaded data with at least one user account of the at least one second user on the determined one or more SNSs to provide the transformed first-user-uploaded data; and a transmission unit configured to transmit a data upload notification message to the at least one second user according to the linking of the transformed first-user-uploaded data with the at least one user account of the at least one second user, wherein the control unit is further configured to determine to upload the transformed first-user-uploaded data to the at least one user account of the at least one second user based on whether or not the at least one second user accepts the data upload notification message, wherein the first-user-uploaded data is associated with the at least one user account of the at least one second user based on user-defined criteria, and wherein the user-defined criteria comprises a relationship set by using statistics or a log.

2. The cloud server of claim 1, wherein the control unit provides the transformed data via the transmission unit to the at least one second user through the determined one or more SNSs.

3. The cloud server of claim 2, further comprising:
a reception unit that receives a request for the first-user-uploaded data from a linked SNS.

4. The cloud server of claim 3, wherein the first-user-uploaded data is divided into sources, and the sources are processed based on the content configuration policies received by the reception unit from the determined one or SNSs.

5. The cloud server of claim 1, wherein the control unit links the transformed first-user-uploaded data with the determined one or more SNSs of the at least one second user by classifying the first-user-uploaded data, and then linking the classified first-user-uploaded data to the at least one user account of the at least one second user in the determined one or more network services associated with the first-user-uploaded data.

6. The cloud server of claim 5, wherein the control unit extracts metadata included in the first-user-uploaded data, and classifies the first-user-uploaded data based on the extracted metadata.

7. The cloud server of claim 1, wherein the user-defined criteria further comprises:
at least one of a family relationship, a friend relationship, and a follower relationship in the one or more SNSs.

8. The cloud server of claim 1, wherein the user-defined criteria further comprises a relationship set based on information received from the determined one or more SNSs.

9. The cloud server of claim 1, wherein the control unit is further configured to:
divide the first-user-uploaded data according to a content type by dividing the first-user-uploaded data into text and multimedia content;
receive content configuration policies from the one or more SNSs; and
process the first-user-uploaded data based on the content configuration policies and the content type.

10. A method of managing data by a cloud server, the method comprising:
receiving data uploaded by a first user, wherein the first-user-uploaded data is stored in a database of the cloud server;
determining one or more Social Network Services (SNSs) of at least one second user from a plurality of SNSs associated with the first-user-uploaded data stored in the database of the cloud server;
transforming the first-user-uploaded data based on properties of the determined one or more SNSs;
linking the transformed first-user-uploaded data with at least one user account of the at least one second user on the determined one or more SNSs;
transmitting a data upload notification message to the at least one second user according to the linking of the transformed first-user-uploaded data with the at least one user account of the at least one second user; and
determining to upload the transformed first-user-uploaded data to the at least one user account of the at least one second user based on whether or not the at least one second user accepts the data upload notification message,
wherein the first-user-uploaded data is associated with the at least one user account of the at least one second user based on user-defined criteria, and
wherein the user-defined criteria comprises a relationship set by using statistics or a log.

11. The method of claim 10, wherein linking the first-user-transformed uploaded data comprises:
classifying the first-user-uploaded data; and
linking the classified first-user-uploaded data with at least one user account of the at least one second user in the determined one or more SNSs associated with the first-user-uploaded data.

12. The method of claim 11, wherein classifying the first-user-uploaded data comprises:
extracting metadata included in the first-user-uploaded data; and
classifying the first-user-uploaded data based on the extracted metadata.

13. The method of claim 10, wherein the user-defined criteria further comprises:
at least one of a family relationship, a friend relationship, and a follower relationship in the one or more SNSs.

14. The method of claim 10, wherein the user-defined criteria further comprises a relationship set based on information received from the one or more SNSs.

15. The method of claim 10, further comprising:
receiving, from a linked SNS, a request for the first user-uploaded data.

16. The method of claim 10, wherein transforming the first-user-uploaded data comprises:
dividing the first-user-uploaded data according to a content type by dividing the first-user-uploaded data into text and multimedia content;
receiving content configuration policies from the determined one or more SNSs; and
processing the first-user-uploaded data based on the content configuration policies and the content type.

17. A non-transitory computer-readable recording medium having recorded thereon a computer program for a cloud server to execute a method of managing data, the method comprising:
receiving data uploaded by a first user, wherein the first-user-uploaded data is stored in a database of the cloud server;
determining one or more Social Network Services (SNSs) of at least one second user from a plurality of SNSs associated with the first-user-uploaded data stored in the database of the cloud server;
transforming the first-user-uploaded data based on properties of the determined one or more SNSs;

linking the transformed first-user-uploaded data with at least one user account of the at least one second user on the determined one or more SNSs to provide the transformed first-user-uploaded data to the at least one second user;

transmitting a data upload notification message to the at least one second user according to the linking of the transformed first-user-uploaded data with the at least one user account of the at least one second user; and determining to upload the transformed first-user-uploaded data to the at least one user account of the at least one second user based on whether or not the at least one second user accepts the data upload notification message, wherein the first-user-uploaded data is associated with the at least one user account of the at least one second user based on user-defined criteria, and wherein the user-defined criteria comprises a relationship set by using statistics or a log.

* * * * *